US010717220B2

(12) United States Patent
Kitaura

(10) Patent No.: US 10,717,220 B2
(45) Date of Patent: Jul. 21, 2020

(54) INJECTION MOLDING MACHINE

(71) Applicant: PASCAL ENGINEERING CORPORATION, Itami-shi, Hyogo (JP)

(72) Inventor: Ichiro Kitaura, Itami (JP)

(73) Assignee: PASCAL ENGINEERING CORPORATION, Hyogo (JP)

(*) Notice: Subject to any disclaimer, the term of this patent is extended or adjusted under 35 U.S.C. 154(b) by 240 days.

(21) Appl. No.: 15/579,826

(22) PCT Filed: Jun. 3, 2016

(86) PCT No.: PCT/JP2016/066606
§ 371 (c)(1),
(2) Date: Dec. 5, 2017

(87) PCT Pub. No.: WO2016/195079
PCT Pub. Date: Dec. 8, 2016

(65) Prior Publication Data
US 2018/0354179 A1     Dec. 13, 2018

(30) Foreign Application Priority Data
Jun. 5, 2015 (JP) .................................. 2015-114757

(51) Int. Cl.
*B29C 45/84* (2006.01)
*B29C 33/32* (2006.01)
*B29C 45/17* (2006.01)

(52) U.S. Cl.
CPC .............. *B29C 45/84* (2013.01); *B29C 33/32* (2013.01); *B29C 45/1742* (2013.01); *B29C 2045/1746* (2013.01)

(58) Field of Classification Search
CPC ..... B29C 45/84; B29C 33/32; B29C 45/1742; B29C 2045/1746; B29C 33/202
See application file for complete search history.

(56) References Cited

U.S. PATENT DOCUMENTS

2004/0052887 A1* 3/2004 Casteel ............... B29C 45/1742
   425/192 R
2009/0022841 A1* 1/2009 Mizuno ................. B29C 33/305
   425/450.1

FOREIGN PATENT DOCUMENTS

JP         0524330 U      3/1993
JP       2000-280252 A   10/2000
(Continued)

OTHER PUBLICATIONS

Kosmek—Quick Mold Change Systems Catalog (2014) (Year: 2014).*

*Primary Examiner* — Jacob T Minskey
*Assistant Examiner* — Virak Nguon
(74) *Attorney, Agent, or Firm* — Norris McLaughlin, P.A.

(57) ABSTRACT

An injection machine which includes a mold falling prevention device that prevents a mold fixed to a mold fixing surface from falling off from the mold fixing surface and in which are provided a bottom edge restriction member at a lower portion of said mold fixing surface so that its vertical position is variable, for implementing restriction so that the bottom edge portion of the mold does not separate from the mold fixing surface, first and second intermediate restriction members at intermediate level portions of the mold fixing surface so that their horizontal positions are variable, for respectively implementing restrictions so that a one edge portion of the mold and an other edge portion thereof in the horizontal direction do not separate from the mold fixing surface, and a vertical direction position determination mechanism that receives and stops a bottom edge surface of the mold and determines a position of the mold in the vertical direction.

7 Claims, 11 Drawing Sheets

(56) References Cited

FOREIGN PATENT DOCUMENTS

| | | | |
|---|---|---|---|
| JP | 2003-245945 A | | 9/2003 |
| JP | 2003245945 A | * | 9/2003 |
| JP | 2003-320570 A | | 11/2003 |
| JP | 3136001 U | | 10/2007 |

* cited by examiner

INJECTION MOLDING MACHINE

TECHNICAL FIELD

The present invention relates to an injection molding machine comprising a mold falling prevention device that prevents a mold from falling off from a mold fixing surface.

BACKGROUND ART

In a prior art injection molding machine, clamp plates are fixed to the surfaces of a pair of platens, a plurality of magnetism generating devices that generate magnetism are installed to the clamp plates for attracting molds to the clamp plates, a pair of molds (a fixed mold and a movable mold) are fixed to the pair of platens by the magnetism generated by these devices, and the movable platen is driven to shift in the direction to approach toward or recede from the fixed platen, and thereby clamping together or separation of the pair of molds is performed. In the state in which the pair of molds are clamped together, synthetic resin in the molten state is injected into a cavity defined between these molds in their interior, and thereby an injection molded product is formed; and thereafter the pair of molds are separated to open them, and the injection molded product is ejected by an ejection mechanism.

Here, in a horizontal type injection molding machine, sometimes shock force operates on the mold, for example during opening of the mold or particularly during ejection for extraction of the injection molded product or the like, and there is a concern of the mold falling off due to this shock force momentarily exceeding the magnetism produced by the magnetism generating devices of the clamp plate. In order to solve these problems, a mold falling prevention device has been proposed in Patent Document #1.

In the mold falling prevention device of Patent Document #1, a bottom edge support device and an upper edge support device are respectively engaged into T shaped grooves that are formed at the lower portion and at the upper portion of a clamp plate that is fixed to the platen of the injection molding machine, and the bottom edge of the mold is supported by a support portion of the bottom edge support device. Moreover, the upper edge of the mold is restricted by a L shaped engagement portion of the upper edge support device so that it cannot come away from (i.e. recede from) the mold fixing surface.

In the mold falling prevention device described in Patent Document #2, at four locations on a contacting surface where a clamp plate (a mold mounting plate) to which a plurality of magnetism generating devices are installed and a mold are contacted together, four key grooves on each side of the contacting surface are formed to be concave and so as to face one another and to communicate together, four key fitting holes are defined by the key grooves of the mold and the clamp plate thus facing one another, and the clamp plate and the mold are integrally connected together by four key members being inserted into and fitted into these four key fitting holes.

And, in the mold falling prevention device described in Patent Document #3, the mold is prevented from falling off by a base block being fixed to a top portion of the clamp plate and one end of a chain member being linked to a link portion of this base block with the position of the link being variable, and by a hook at the other end of the chain member being linked to a U shaped supported member that is formed on the mold.

PRIOR ART DOCUMENT

Patent Document

Patent Document #1: Japanese Laid Open Patent Publication 2003-320570. Patent Document #2: Japanese Laid Open Patent Publication 2000-280252. Patent Document #3: Japanese Utility Model Registration 3,136,001.

SUMMARY OF INVENTION

Technical Problem

However, with the mold falling prevention device of Patent Document #1, although in the upper edge support device the upper end portion of the mold is restricted by the L shaped engagement portion so that it cannot recede from the mold fixing surface, since in the bottom edge support device the bottom edge surface of the mold is only supported by the support portion, accordingly this construction does not restrict the bottom edge portion of the mold so that it cannot recede from the mold fixing surface. For this reason, there is a concern of the mold falling off if a large shock acts on the mold and the bottom edge portion of the mold recedes from the mold fixing surface.

And, with the device of Patent Document #2, the construction becomes complicated because key grooves are formed on the clamp plate and on the mold and key members are inserted into these grooves, and there is the problem that the manufacturing cost becomes high. Also, a device has recently appeared in which a mold falling off prevention block is provided only to the lower portion of the clamp plate, but this entails a loss of reliability.

Moreover, with the device of Patent Document #3, with the mold and the clamp plate being only linked together by a chain, since there is a concern that if the chain becomes long then the shock force of the mold falling off may break the chain, accordingly, each time the mold is exchanged, it is necessary for the operator to perform the job of climbing up to a high point at the top portion of the clamp plate and linking an appropriate part of the one end portion of the chain so as to correspond to the size of the mold to the base block, and this task requires a considerable amount of time and labor.

The object of the present invention is to provide an injection molding machine comprising a mold falling prevention device that is capable of reliably preventing a mold fixed to a mold fixing surface from falling off.

Means to Solve the Problem

The present invention presents an injection molding machine comprising a mold falling prevention device that prevents a mold attached to a mold fixing surface from falling off from the mold fixing surface, characterized by comprising: a bottom edge restriction member that is provided to a lower portion of the mold fixing surface so that a position of said bottom edge restriction member in a vertical direction is variable, for implementing restriction so that a bottom edge portion of the mold does not separate from the mold fixing surface; and first and second intermediate restriction members that are provided to intermediate level portions of the mold fixing surface so that positions of said first and second intermediate restriction members in a horizontal direction are variable, for respectively implementing restrictions so that a one edge portion of the mold and an other edge portion thereof in the horizontal direction do not separate from the mold fixing surface, wherein a vertical direction position determination mechanism that receives and stops a bottom edge surface of the mold and determines a position of the mold in the vertical direction is provided at a lower portion of the mold fixing surface; the vertical direction position determination mechanism comprises a base member fixed to the mold fixing surface, a bottom edge mold reception member disposed above the base member, a pair of guide rods that guide the bottom edge mold reception member so that it is capable of ascending and descending with respect to the base member, a fluid pressure cylinder provided to the base member and capable of raising and lowering the bottom edge mold reception member, and a plurality of support members installed between the base member and the bottom edge mold reception member and capable of supporting the mold; and the bottom edge mold reception member and the bottom edge restriction member are formed integrally with one another.

In a preferable first aspect of the invention, a fixed side clamp plate to which a plurality of magnetism generating devices are installed may be fixed to a plate surface of a fixed platen of the injection molding machine, with one set of the mold falling prevention device being provided to the mold fixing surface of the fixed side clamp plate; and a movable side clamp plate to which a plurality of magnetism generating devices are installed may be fixed to a plate surface of a movable platen of the injection molding machine, with one set of the mold falling prevention device being provided to a mold fixing surface of the movable side clamp plate.

In a preferable second aspect of the invention, a horizontal direction position determination mechanism that receives and stops the one edge portion of the mold from an operating side of the injection molding machine with a one mold edge reception member and that determines a position of the mold in the horizontal direction may be provided at an intermediate level portion of the fixed platen or of the fixed side clamp plate; and the one mold edge reception member and the first intermediate restriction member of the horizontal direction position determination mechanism may be formed integrally with one another.

In a preferable third aspect of the invention, the vertical direction position determination mechanism may be adapted to be capable of adjusting a position in the vertical direction of the bottom edge mold reception member, and the horizontal direction position determination mechanism may be adapted to be capable of adjusting the position in a horizontal direction of the one mold edge reception member.

In a preferable fourth aspect of the invention, the second intermediate restriction member may be disposed in a position corresponding to the other edge portion of the mold, and this second intermediate restriction member may be built to shift freely in the horizontal direction; and a fluid pressure cylinder may be provided that is capable of shifting the second intermediate restriction member in the horizontal direction.

In a preferable fifth aspect of the invention, the bottom edge restriction member may comprise a bottom edge portion locking member that approaches and opposes the bottom edge portion of the mold from an opposite side to the mold fixing surface; and the first intermediate restriction member may comprise a one edge portion locking member that approaches and opposes the one edge portion of the mold from an opposite side to the mold fixing surface, and the second intermediate restriction member may comprise an other edge portion locking member that approaches and opposes the other edge portion of the mold from an opposite side to the mold fixing surface.

Advantages of Invention

Since the invention of the present application has the structure described in the section "MEANS TO SOLVE THE PROBLEM" above, accordingly it provides the following beneficial effects.

According to the present invention, since it is possible, with the bottom edge restriction member and the first and second intermediate restriction members, to implement restriction so that the mold does not separate from the mold fixing surface at three locations, i.e. at the bottom edge portion of the mold and at the one edge portion and the other edge portion thereof in the horizontal direction, accordingly falling off of the mold can be reliably prevented, and the reliability is excellent.

Along with it being possible to receive and stop the bottom edge surface of the mold with the vertical direction position determination mechanism and to determine its position in the vertical direction, it is also possible to adjust the position in the vertical direction of the bottom edge restriction member with the vertical direction position determination mechanism to a position that corresponds to the size of the mold.

According to the first aspect of the invention, it is possible reliably to prevent falling off of the mold from the mold fixing surface of the fixed side clamp plate, and to prevent falling off of the mold from the mold fixing surface of the movable side clamp plate.

According to the second aspect of the invention, along with it being possible to receive and stop the one edge portion of the mold from the operating side of the injection molding machine with the horizontal direction position determination mechanism and to determine its position in the horizontal direction, it is also possible to adjust the position in the horizontal direction of the first intermediate restriction member with the horizontal direction position determination mechanism to a position that corresponds to the size of the mold.

According to third aspect of the invention, it is possible to determine the position of molds of various sizes in the horizontal direction and in the vertical direction.

According to the fourth aspect of the invention, after the position of the mold on the mold fixing surface has been determined, the second intermediate restriction member is shifted in the horizontal direction toward the mold by the fluid pressure cylinder, so that the second intermediate restriction member is changed over to a state in which it provides its anticipated function.

According to the fifth aspect of the invention, due to the bottom edge portion locking member of the bottom edge restriction member, it is possible reliably to restrict falling off of the bottom edge portion of the mold from the mold fixing surface; due to the one edge portion locking member of the first intermediate restriction member, it is possible reliably to restrict falling off of the one edge portion of the mold from the mold fixing surface, and moreover, due to the other edge portion locking member of the second intermediate restriction member, it is possible reliably to restrict falling off of the other edge portion of the mold from the mold fixing surface.

DESCRIPTION OF EMBODIMENTS

Preferable concrete examples of the present invention will now be explained on the basis of the first and second embodiments.

First Embodiment

First, an injection molding machine 1 will be explained.

Figure 1:
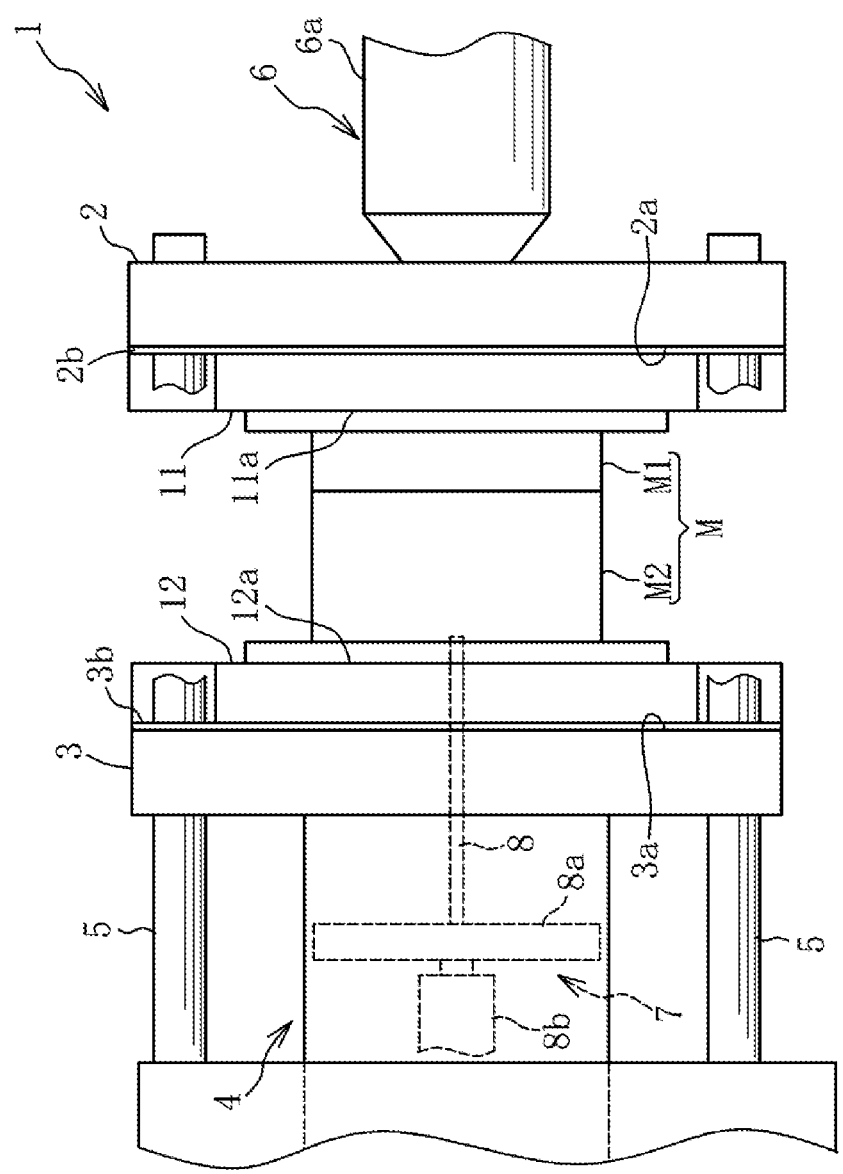
FIG. 1 is a figure showing an injection molding machine according to a first embodiment of the present invention, as seen from its operating side.

As shown in FIG. 1, an injection molding machine 1 comprises: a mutually opposing fixed platen 2 and movable platen 3 for fixation of a mold M (a fixed mold M1 and a movable mold M2); a platen drive mechanism 4 having a fluid pressure cylinder (or a drive motor) for performing clamping together and opening of the mold M, which drives the movable platen 3 with respect to the fixed platen 2, so that it approaches toward or recedes from it; four guide rods 5 that guide and support the movable platen 3 so that it can shift freely in the direction to approach toward or recede from the fixed platen; an injection mechanism 6 having an injection nozzle 6a for supplying synthetic resin in a molten state into the mold M; an ejection mechanism 7 that extracts the molded product from the movable mold M2; a fixed side clamp plate 11 that is fixed to a plate surface 2a of the fixed platen 2; a movable side clamp plate 12 that is fixed to a plate surface 3a of the movable platen 3; heat insulating plates 2b, 3b that are installed between the platens 2, 3 and the clamp plates 11, 12 respectively; a mold falling prevention device 20 (not shown in FIG. 1) that is provided to the fixed side clamp plate 11; a mold falling prevention device 60 (not shown in FIG. 1) that is provided to the movable side clamp plate 12; and so on.

When injection molding is to be performed with the injection molding machine 1, the movable platen 3 is driven by the platen drive mechanism 4 in the direction to approach the fixed platen 2, the state in which the movable mold M2 is pressed against the fixed mold M1 is established, and, in this state, molten synthetic resin is injected from the end of the injection nozzle 6a into the conjoined mold M. Thereafter, the movable platen 3 is driven by the platen drive mechanism 4 in the direction to recede from the fixed platen 2, so that the movable mold M2 is brought away from the fixed mold M1 and the mold open state is established. In this state, the molded product is ejected from the movable mold M2 by the ejection mechanism 7.

The ejection mechanism 7 comprises an ejector pin 8, an ejector plate 8a to which the base end portion of the ejector pin 8 is connected, and a fluid pressure cylinder 8b that drives the ejector pin 8 forward and backward via the ejector plate 8a.

Figure 2:
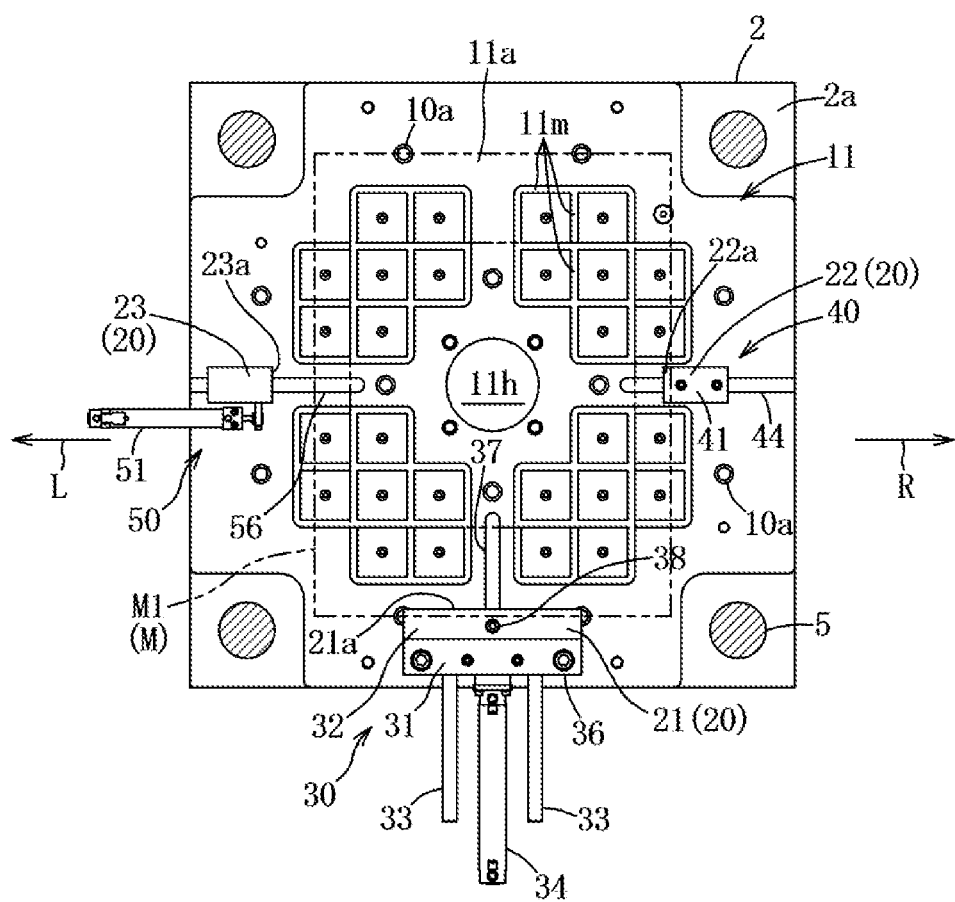
FIG. 2 is an elevation view of a fixed platen, a fixed side clamp plate, and a mold falling prevention device.
Figure 10:
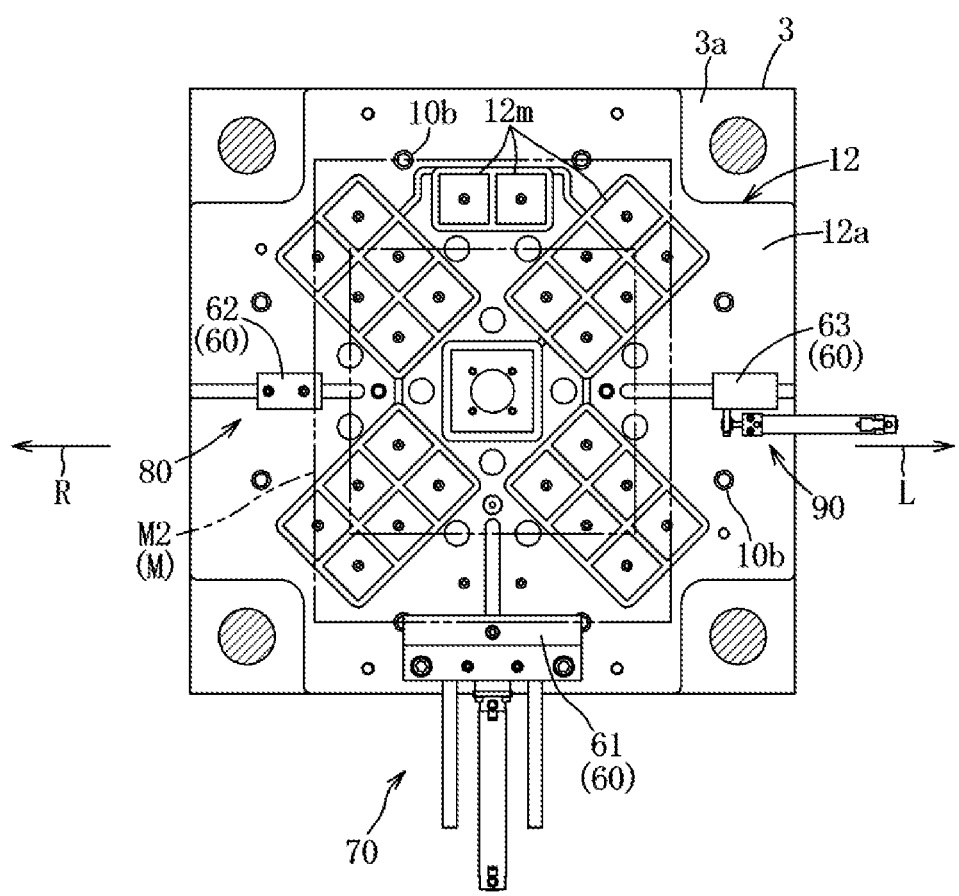
FIG. 10 is a rear view of a movable platen, a movable side clamp plate, and a mold falling prevention device.

In the following explanation, the arrow L in FIGS. 2 and 10 indicates the leftward direction and the arrow R indicates the rightward direction, while the direction outward from the drawing paper in FIG. 2 is to be taken as forward and the direction outward from the drawing paper in FIG. 10 is to be taken as rearward.

Next, the fixed side clamp plate 11 will be explained.

As shown in FIGS. 1 and 2, the fixed side clamp plate 11 is a plate made from steel, and is of almost the same size as the fixed platen 2. The clamp plate 11 is fixed by a plurality of bolts 10a to the plate surface 2a of the fixed platen 2. A plurality of magnetism generating devices 11m are provided to the clamp plate 11, and these magnetism generating devices 11m generate magnetism for fixing the mold M1 to a mold fixing surface 11a at the front surface of the clamp plate. A fitting hole 11h into which a locator ring of the mold M is fitted is formed at the central portion of the clamp plate 11, at the end portion of an insertion hole into which the injection nozzle is inserted.

Next, the movable side clamp plate 12 will be explained.

As shown in FIGS. 1 and 10, the movable side clamp plate 12 is a plate made from steel, and is of almost the same size as the movable platen 3. The clamp plate 12 is fixed by a plurality of bolts 10b to the plate surface 3a of the movable platen 3. A plurality of magnetism generating devices 12m are provided to the clamp plate 12, and these magnetism generating devices 12m generate magnetism for fixing the mold M2 to a mold fixing surface 12a at the front surface of the clamp plate 12.

A mold falling prevention device 20 is provided to the clamp plate 11, so as to ensure that the mold M1 that is attached to its mold fixing surface 11a does not fall off from the mold fixing surface 11a, and a mold falling prevention device 60 is provided to the clamp plate 12, so as to ensure that the mold M2 that is attached to its mold fixing surface 12a does not fall off from the mold fixing surface 12a.

First, the mold falling prevention device 20 that is provided to the clamp plate 11 will be explained. The mold falling prevention device 20 comprises: a bottom edge restriction member 21 that is provided at the lower portion of the mold fixing surface 11a in a manner such that its position in the vertical direction is variable, and that exerts restriction so that the bottom edge portion of the mold M1 does not separate from the mold fixing surface 11a; first and second intermediate restriction members 22, 23 that are provided at intermediate level portions of the mold fixing surface 11a in a manner such that their positions in the horizontal direction are variable, and each of which exerts restriction so that, respectively, a one edge portion (the right edge portion) and the other edge portion (the left edge portion) of the mold M1 do not separate from the mold fixing surface 11a; a vertical direction position determination mechanism 30 that is capable of adjusting the position of the bottom edge restriction member 21 in the vertical direction according to the size of the mold M1; a horizontal direction position determination mechanism 40 that is capable of adjusting the position of the first intermediate restriction member 22 in the horizontal direction (i.e. in the left to right direction) according to the size of the mold M1; and a horizontal direction position change mechanism 50 that is capable of changing the position of the second intermediate restriction member 23 according to the size of the mold M1.

Next, the vertical direction position determination mechanism 30 and the bottom edge restriction member 21 will be explained on the basis of FIGS. 2 through 5. This vertical direction position determination mechanism 30 is a device for, along with receiving and stopping the bottom edge surface of the mold M1 and determining its position in the vertical direction, also adjusting the position of the bottom edge restriction member 21 in the up and down direction, and is provided at the lower portion of the mold fixing surface 11a so as to be capable of varying the position of the bottom edge restriction member 21 in the vertical direction.

This vertical direction position determination mechanism 30 comprises: a base member 31 that is fixed to the lower portion of the mold fixing surface 11a; a bottom edge mold reception member 32 provided above the base member 31; a pair of guide rods 33 that guide the bottom edge mold reception member 32 with respect to the base member 31 so that it can be raised and lowered; a fluid pressure cylinder 34 (for example an air cylinder) that is provided to the base member 31 and that can raise and lower the bottom edge mold reception member 32; and a plurality of support members 35 (refer to FIG. 3) that are installed between the base member 31 and the bottom edge mold reception member 32 and that are capable of supporting the mold M.

The bottom edge mold reception member 32 and the bottom edge restriction member 21 are formed integrally as a common member, and the bottom edge restriction member 21 has a bottom edge portion locking member 21a that approaches and opposes the front surface of the bottom edge portion of the mold M1 from its side opposite to the mold fixing surface 11a. The bottom edge portion of the mold M1 is restricted by the bottom edge portion locking member 21a, so that it does not shift forward.

Figure 3:
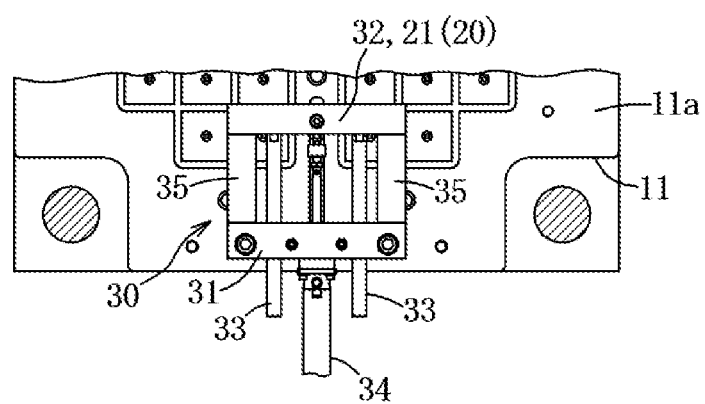
FIG. 3 is a partial elevation view showing a vertical direction position determination mechanism when position determination is being performed for molds of various different sizes.
Figure 4:
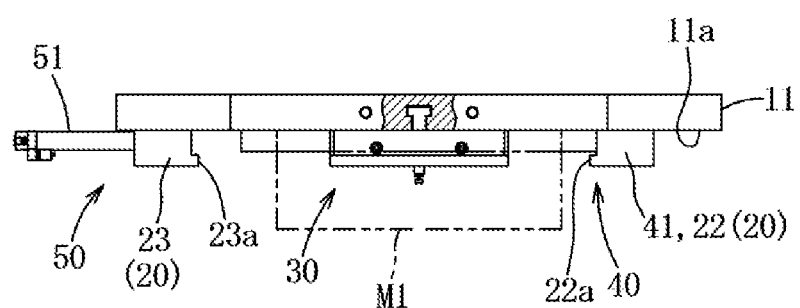
FIG. 4 is a plan view of the fixed side clamp plate and a mold falling prevention device.
Figure 5:
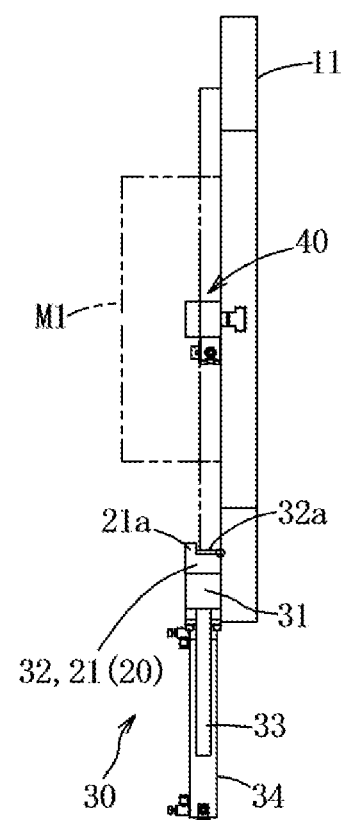
FIG. 5 is a right side view of the fixed side clamp plate and the mold falling prevention device.
Figure 6:
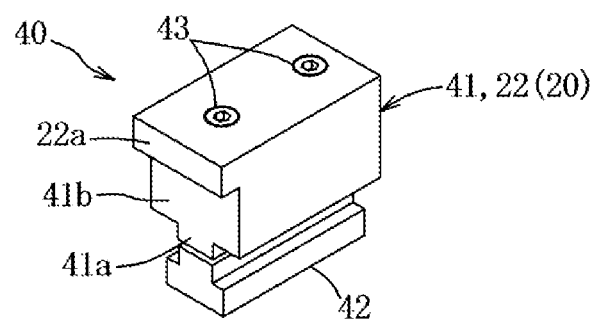
FIG. 6 is a perspective view of a horizontal direction position determination mechanism that includes a first intermediate restriction member.
Figure 7:
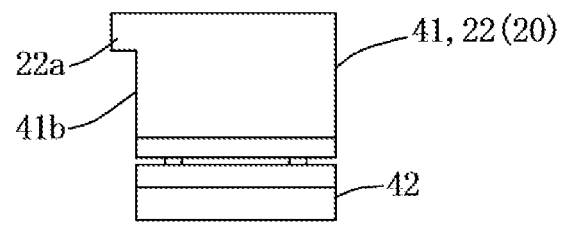
FIG. 7 is a bottom view of the horizontal direction position determination mechanism including the first intermediate restriction member.
Figure 8:
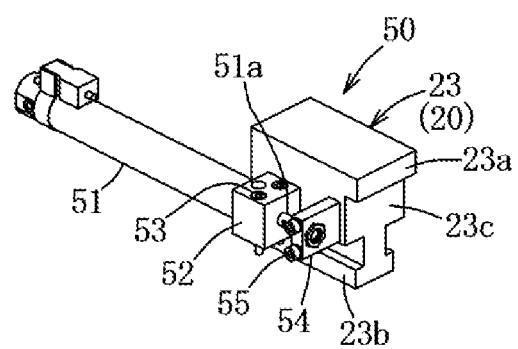
FIG. 8 is a perspective view of a horizontal direction position change mechanism that includes a second intermediate restriction member.
Figure 9:
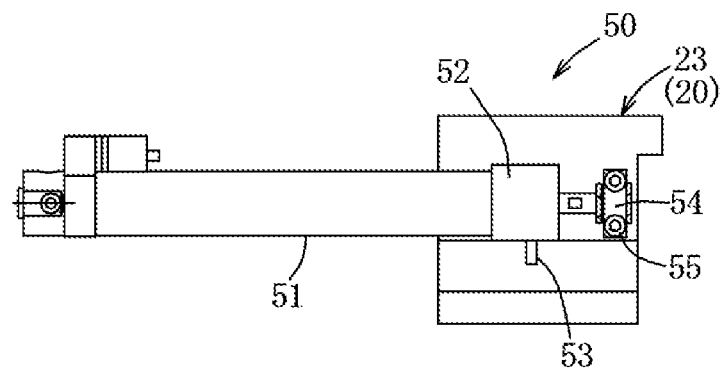
FIG. 9 is a bottom view of the horizontal direction position change mechanism including the second intermediate restriction member.

Support members of a plurality of types of different lengths are provided in advance as the support members 35, and, as shown in FIG. 3, those of these support members 35 that are of length corresponding to the size of the mold M1 are employed. However, FIG. 2 shows a situation in which a mold M1 of the maximum size is being positionally determined, and in this case support members 35 are omitted. It would be possible to employ a hydraulic pressure cylinder as the fluid pressure cylinder 34.

The base member 31 is a rectangular parallelepiped member that is long and narrow in the left to right direction, and is fixed to the mold fixing surface 11a by a pair of fixing bolts 36. The pair of guide rods 33 are passed through a pair of guide holes that are formed in the base member 31 in a vertical orientation so as to slide freely therein, and the bottom edge mold reception member 32 (i.e. the bottom edge restriction member 21) is adhered to the upper end portions of the pair of guide rods 33.

A T groove 37 is formed in a vertical orientation in the fixed side clamp plate 11 at a position corresponding to the center of the bottom edge mold reception member 32 in the left to right direction, and a bolt 38 that passes through the bottom edge mold reception member 32 is screwed into and engaged with a T groove nut member (not shown in the figures) within the T groove 37, so as to exert restriction so that the bottom edge mold reception member 32 does not shift forward.

The fluid pressure cylinder 34 is disposed in a vertically oriented attitude, and the upper end portion of its cylinder main body is fixed to the central portion of the base member 31, while the upper end portion of its piston rod is fixed to the bottom edge mold reception member 32, so that, with this structure, it is possible for the bottom edge mold reception member 32 to be driven by the fluid pressure cylinder 34 to move upward and downward. And a horizontal mold reception surface 32a that determines the position of the bottom edge surface of the mold M1 in the vertical direction by receiving and stopping it is formed on the upper end surface of the bottom edge mold reception member 32.

When the positions in the vertical direction and in the horizontal direction of a mold M (consisting of the molds M1 and M2 that are integrally connected together) that is hanging from a crane and is being brought in from above is to be determined, after having driven the bottom edge mold reception member 32 with the fluid pressure cylinder 34 to move upward or downward so that the mold reception surface 32a of the bottom edge mold reception member 32 is positioned at a height that corresponds to the size of the mold M, then a plurality of the support members 35 having lengths corresponding to the size of the mold M are installed between the base member 31 and the bottom edge mold reception member 32, and the bottom edge surface of the fixed mold M1 of the mold M is received and stopped by the bottom edge mold reception member 32, so that the position of the mold M in the vertical direction is determined. However, after this position determination of the mold M, in the state in which the locator ring of the mold M1 (not shown in the figure) is fitted into the fitting hole 11h of the mold fixing surface 11a, it is arranged for a slight gap to be defined between the bottom edge of the mold M1 and the mold reception surface 32a of the bottom edge mold reception member 32.

Next, the horizontal direction position determination mechanism 40 will be explained on the basis of FIGS. 2 and 4 through 7.

This horizontal direction position determination mechanism 40 is a device for, together with the determination of the position of the mold M1 with respect to the mold fixing surface 11a in the vertical direction, also adjusting the position in the horizontal direction of the first intermediate restriction member 22 described above, according to the size of the mold M1.

The horizontal direction position determination mechanism 40 is provided at a location on the intermediate level part of the injection molding machine that is close to its operating side (i.e. its side where an operating panel is located), and is built so as to be capable of receiving and stopping the operating side edge surface of the mold M1 that is orthogonal to the horizontal direction (i.e. its right edge surface) and thereby determining the position of the mold M in the horizontal direction. This horizontal direction position determination mechanism 40 comprises a one mold edge reception member 41 that receives and stops the operating side edge surface of the mold M1, a T groove nut member 42, and a pair of bolts 43.

The one mold edge reception member 41 is formed integrally as a common member with the first intermediate restriction member 22. This one mold edge reception member 41 (i.e. the first intermediate restriction member 22) is formed as a rectangular parallelepiped member and is installed to the mold fixing surface 11a, with an engagement portion 41a being formed at the center of the bottom edge portion of the one mold edge reception member 41 and partially engaging into a T groove 44 of the clamp plate 11. A one edge portion locking member 22a that projects leftward is formed at the left end portion of the front end portion of the first intermediate restriction member 22, so as to approach and oppose the one edge portion of the mold M1 from the opposite side of the mold M1 to the mold fixing surface 11a.

The T groove nut member 42 is a member that has an inverted T shaped cross section and that is received within the T groove 44 so as to slide freely, and the one mold edge reception member 41 is fixed to the mold fixing surface 11a so that its position in the horizontal direction can be changed by the two bolts 43, which have been passed through bolt holes in the one mold edge reception member 41 from above, being screwed and engaged into screw holes of the T groove nut member 42, and being tightened. In the left end surface of the one mold edge reception member 41, the rearward portion than the one edge portion locking member 22a (i.e. its lower side left end surface in FIG. 6) serves as a mold reception surface 41b for determining the position of the mold M.

A plurality of reference lines are inscribed on the mold fixing surface 11a in the neighborhood of the region of shifting of the one mold edge reception member 41, and the position of the one mold edge reception member 41 in the horizontal direction is set by bringing its mold reception surface 41b to coincide with one of these reference lines that corresponds to the size of the mold M1. However, it would also be acceptable to arrange to inscribe a scale with 1 mm divisions at a location on the lower side of the one mold edge reception member 41 in the neighborhood of the mold fixing surface 11a, and to set the position of the one mold edge reception member 41 in the horizontal direction on the basis of this scale and the above reference lines.

Next, the horizontal direction position change mechanism 50 will be explained on the basis of FIGS. 2, 4, 8, and 9. The second intermediate restriction member 23 is a such member that is constituted by the one mold edge reception member 41 and the T groove nut member 42 being unified together, and, on a rear half portion thereof, a T groove foot portion 23 is formed that is received in the T groove 56 so as to slide freely, so that the front half portion of the second intermediate restriction member 23 is installed to the mold fixing surface 11a so as to slide freely. An other edge portion locking member 23a that projects rightward is integrally formed at the right end portion of the front end portion of the second intermediate restriction member 23, so as to approach and oppose the other edge portion of the mold M1 from the opposite side of the mold M1 to the mold fixing surface 11a.

In the right end surface of the second intermediate restriction member 23, rearward portion than the second intermediate restriction member 23a (i.e. the lower right end surface in FIG. 8) is a contacting surface 23c that contacts against the mold M1.

A fluid pressure cylinder 51 is provided for shifting the second intermediate restriction member 23 in the horizontal direction, and the fluid pressure cylinder 51 is disposed in a horizontal orientation in a position below and in the neighborhood of the second intermediate restriction member 23, with a rod side end wall member 52 of the fluid pressure cylinder 51 being fixed to the mold fixing surface 11a by two bolts 53. A link plate 54 is attached by two bolts 55 to the lower side surface of the second intermediate restriction member 23, and the tip end portion of a piston rod 51a of the fluid pressure cylinder 51 is linked to the link plate 54 described above.

When the mold M is brought down from above, the second intermediate restriction member 23 is backed up leftward as shown in FIG. 2, and, after position determination of the mold M has been completed, the second intermediate restriction member 23 is shifted rightward by the fluid pressure cylinder 51 and its contacting surface 23c is brought to contact against the other edge surface of the mold M1, so that the other edge portion locking member 23a opposes the other edge portion of the mold M1 from the front.

Figure 11:
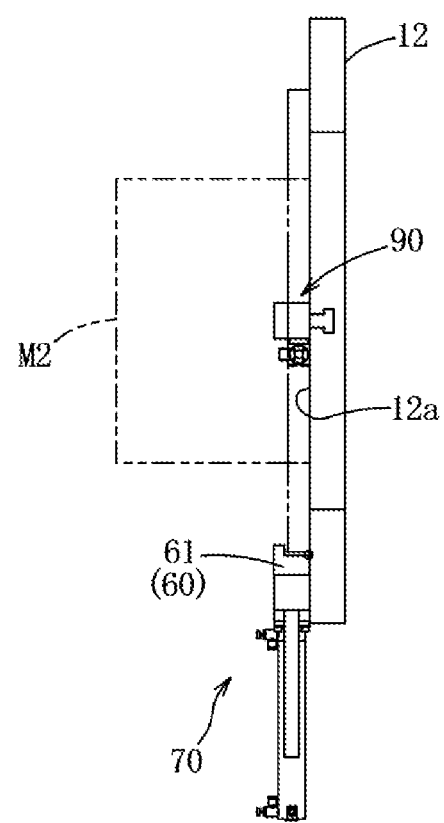
FIG. 11 is a left side view of the movable side clamp plate and the mold falling prevention device.

Next, the mold falling prevention device 60 that is provided to the movable side clamp plate 12 will be explained on the basis of FIGS. 10 and 11. The mold falling prevention device 60 comprises: a bottom edge restriction member 61 that is provided at the lower portion of the mold fixing surface 12a in a manner such that its position in the vertical direction is variable, and that exerts restriction so that the bottom edge portion of the mold M2 does not separate from the mold fixing surface 12a; first and second intermediate restriction members 62, 63 that are provided at intermediate level portions of the mold fixing surface 12a in a manner such that their positions in the horizontal direction are variable, and each of which respectively exerts restriction so that one edge portion in the horizontal direction (the right edge portion) and the other edge portion (the left edge portion) of the mold M2 do not separate from the mold fixing surface 12a; a vertical direction position change mechanism 70 that is capable of changing the position of the bottom edge restriction member 61 in the vertical direction, according to the size of the mold M2; a horizontal direction position change mechanism 80 that is capable of changing the position of the first intermediate restriction member 62 in the horizontal direction, according to the size of the mold M2; and a horizontal direction position change mechanism 90 that is capable of changing the position of the second intermediate restriction member 63 in the horizontal direction, according to the size of the mold M2.

Since the bottom edge restriction member 61 is similar to the bottom edge restriction member 21 described above, and also the vertical direction position change mechanism 70 is similar to the vertical direction position determination mechanism 30 described above, accordingly explanation thereof will be omitted.

Since the first intermediate restriction member 62 is similar to the first intermediate restriction member 22 described above, and also the horizontal direction position change mechanism 80 is similar to the horizontal direction position determination mechanism 40 described above, accordingly explanation thereof will be omitted. And, since the second intermediate restriction member 63 is similar to the second intermediate restriction member 23 described above, and also the horizontal direction position change mechanism 90 is similar to the horizontal direction position change mechanism 50 described above, accordingly explanation thereof will be omitted.

During position determination when the mold M is brought in from above, position determination in the vertical direction is not performed by the vertical direction position change mechanism 70, and moreover position determination in the horizontal direction is not performed by the horizontal direction position change mechanism 50, since there is a clearance between the mold M2 and the mold fixing surface 12a of the clamp plate 12.

After the position determination of the mold M has been completed, in the state in which the movable platen 3 is shifted toward the clamping position and the mold M2 has been contacted against the mold fixing surface 12a, the bottom edge restriction member 61 is raised by the vertical direction position change mechanism 70 and is contacted against the bottom edge surface of the mold M2, the first intermediate restriction member 62 is shifted leftward by the horizontal direction position change mechanism 80 and is contacted against the right end surface of the mold M2, and the second intermediate restriction member 63 is shifted rightward by the horizontal direction position change mechanism 90 and is contacted against the left end surface of the mold M2.

The operation and the beneficial effects of the mold falling prevention devices 20, 60 described above will now be explained.

When, during the operation of the injection molding machine 1, the mold M is to be opened or a molded product is to be ejected, then, even if a shock force acts on the mold M1 that is fixed to the fixed side clamp plate 11, since the bottom edge portion of the mold M1 is restricted by the bottom edge restriction member 21 so that it cannot shift forward, the one edge portion of the mold M1 is restricted by the first intermediate restriction member 22 so that it cannot shift forward, and the other edge portion of the mold M2 is restricted by the second intermediate restriction member 23 so that it cannot shift forward, accordingly it is possible reliably to prevent the mold M1 from falling off from the mold fixing surface 11a, and the reliability is excellent. This also is applicable similarly for the mold M2 that is fixed to the clamp plate 12.

In particular, the security and the reliability are excellent, since, with the bottom edge portion locking member 21a of the bottom edge restriction member 21, it is possible reliably to prevent falling off of the mold M1 from the bottom edge portion of the mold fixing surface 11a, with the one edge portion locking member 22a of the first intermediate restriction member 22, it is possible reliably to prevent falling off of the mold M1 from the one edge portion of the mold fixing surface 11a, and, with the other edge portion locking member 23a of the second intermediate restriction member 23, it is possible reliably to prevent falling off of the mold M1 from the other edge portion of the mold fixing surface 11a. This also is applicable similarly for the mold M2 that is fixed to the clamp plate 12.

As a consequence of it being possible to perform positional determination of the bottom edge surface of the mold M in the vertical direction by receiving and stopping with the vertical direction position determination mechanism 30, it is possible, according to the size of the mold M, to adjust the position in the vertical direction of the bottom edge restriction member 21 with the vertical direction position determination mechanism 30. Moreover, as a consequence of it being possible to perform positional determination of the one edge portion of the mold M in the horizontal direction by receiving and stopping with the horizontal direction position determination mechanism 40 from the operating side of the injection molding machine, it is possible, according to the size of the mold M, to adjust the position in the horizontal direction of the first intermediate restriction member 22 with the horizontal direction position determination mechanism 40. In this manner, it is possible to perform position determination for molds M of various sizes, both in the vertical direction and in the horizontal direction.

After the position of the mold M on the mold fixing surface 11a has been determined and fixed, the second intermediate restriction member 23 is shifted toward the mold M by the fluid pressure cylinder 51 of the horizontal direction position change mechanism 50, and thereby the second intermediate restriction member 23 can be changed over into the state in which it fulfils its anticipated function.

Second Embodiment

Figure 12:
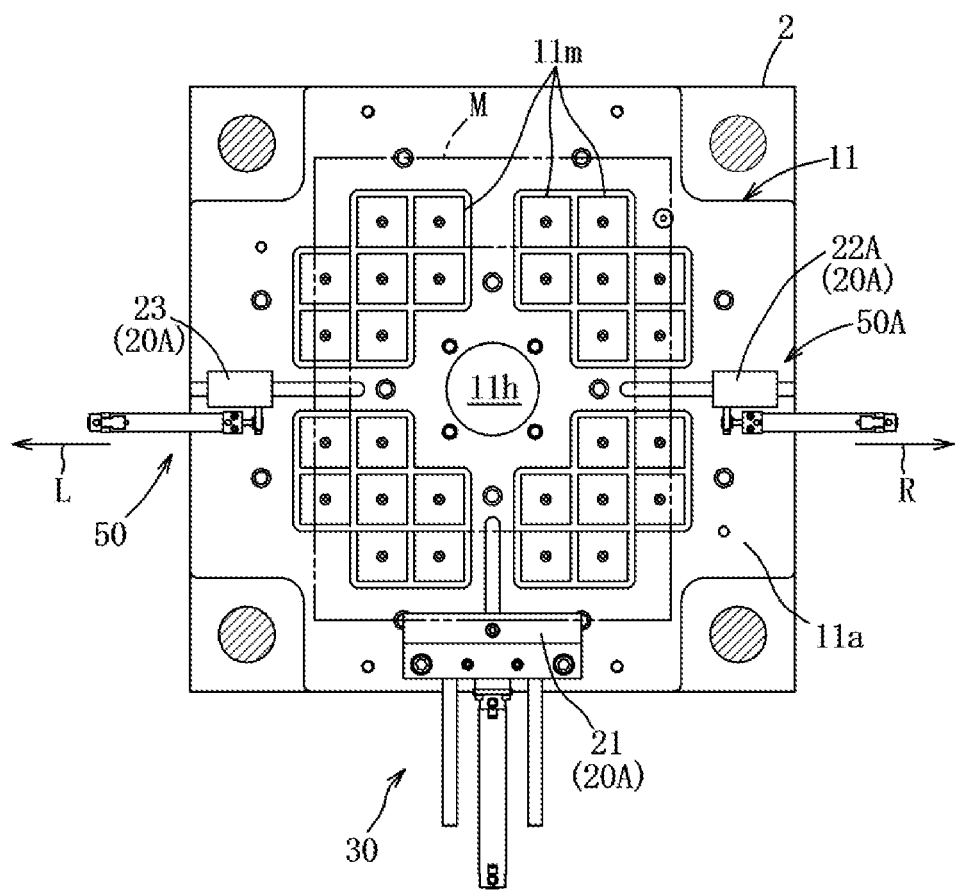
FIG. 12 is a figure corresponding to FIG. 2, relating to a second embodiment.
Figure 13:
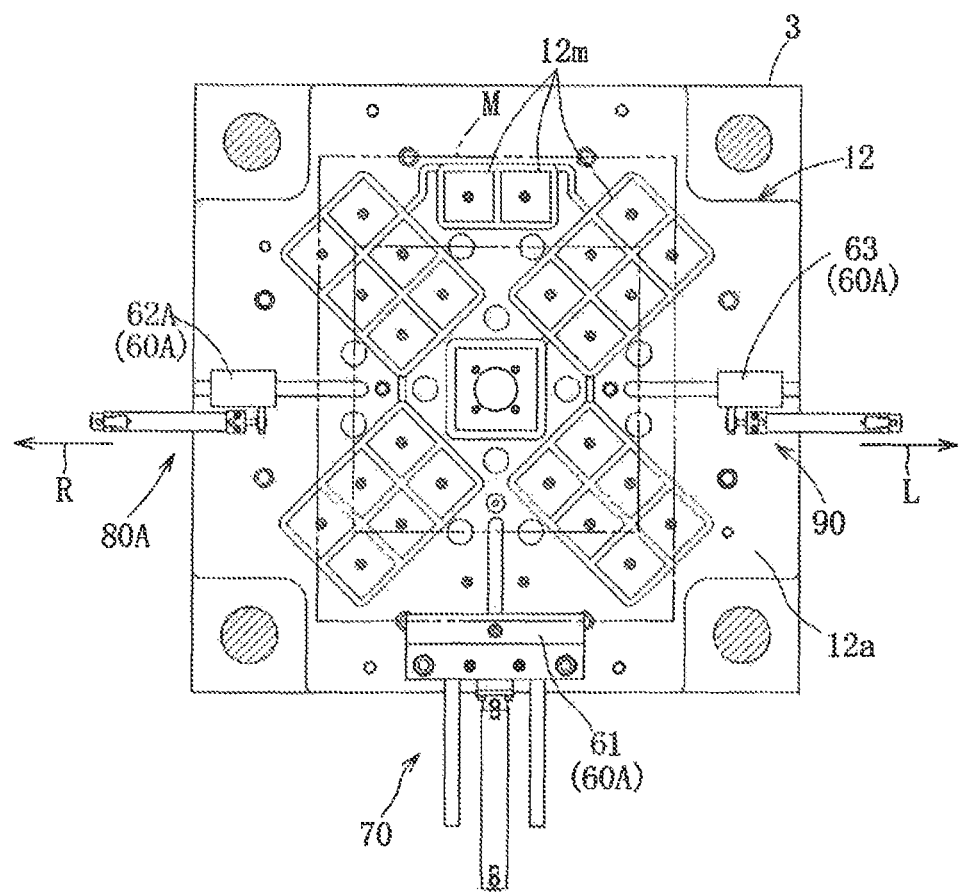
FIG. 13 is a figure corresponding to FIG. 10, relating to the second embodiment.

Mold falling prevention devices 20A, 60A for an injection molding machine according to a second embodiment will now be explained on the basis of FIGS. 12 and 13. However, the same reference numerals will be appended to elements that are the same as ones in the first embodiment, and explanation thereof will be omitted, with only the structures that are different being explained. The mold falling prevention device 20A that is provided to the clamp plate 11 comprises a bottom edge restriction member 21 that is provided at the lower portion of the mold fixing surface 11a so that its position in the vertical direction is variable and that is for exercising restriction so that the bottom edge portion of the mold M1 does not separate from the mold fixing surface 11a, and first and second intermediate restriction members 22A, 23 that are provided at intermediate level portions of the mold fixing surface 11a so that their positions in the horizontal direction are variable and that are for exercising restriction so that, respectively, the one edge portion (i.e. the right edge portion) of the mold M1 in the horizontal direction and the other edge portion thereof (i.e. the left edge portion thereof) do not separate from the mold fixing surface 11a.

A horizontal direction position change mechanism 50A that changes the position in the horizontal direction of the first intermediate restriction member 22A is provided. This horizontal direction position change mechanism 50A is the same as the horizontal direction position change mechanism 50 (although with left and right reversed).

With this mold falling prevention device 20A, determination of the position of the mold M in the horizontal direction is performed by a means not shown in the figure, and, after that position determination, the first intermediate restriction member 22A is shifted leftward by the horizontal direction position change mechanism 50A, and is contacted against the right edge of the mold M1. Apart from the above, this mold falling prevention device provides similar beneficial effects to those of the mold falling prevention device 20 described above.

And the mold falling prevention device 60A that is provided to the clamp plate 12 comprises a bottom edge restriction member 61 that is provided at the lower portion of the mold fixing surface 12a so that its position in the vertical direction is variable and that is for exercising restriction so that the bottom edge portion of the mold M1 does not separate from the mold fixing surface 12a, and first and second intermediate restriction members 62A, 63 that are provided at intermediate level portions of the mold fixing surface 12a so that their positions in the horizontal direction are variable and that are for exercising restriction so that, respectively, the one edge portion (i.e. the right edge portion) of the mold M2 in the horizontal direction and the other edge portion thereof (i.e. the left edge portion thereof) do not separate from the mold fixing surface 12a.

A horizontal direction position change mechanism 80A that changes the position in the horizontal direction of the first intermediate restriction member 62A is provided. This horizontal direction position change mechanism 80A is the same as the horizontal direction position change mechanism 90 (although with left and right reversed).

With this mold falling prevention device 60A, since the horizontal direction position change mechanism 80A that changes the position of the first intermediate restriction member 62A in the horizontal direction is provided, accordingly changing of the position of the first intermediate restriction member 62A can be performed in a simple manner. Apart from the above, this mold falling prevention device provides similar beneficial effects to those of the mold falling prevention device 20 described above.

Next, examples in which the first and second embodiments described above are partially altered will be explained.

[1] In the vertical direction position determination mechanism 30 described above, it would also be acceptable to provide a structure in which one or a plurality of screw shafts are provided, these screw shafts are screwed into and engaged with screw holes in the base member 31, and the bottom edge mold reception member 32 (i.e. the bottom edge restriction member 21) is raised and lowered via the screw shafts, instead of by the fluid pressure cylinder 3. In this case, the support members 35 may be omitted.

[2] It would also be acceptable to employ a similar member to the second intermediate restriction member 23 for the first intermediate member of the horizontal position determination mechanism 40, with a screw shaft that is disposed within the T groove 44 being passed through and screwed into and engaged with the T groove foot portion of the first intermediate restriction member 22, so that the first intermediate restriction member 22 may be driven to shift in the horizontal direction by the screw shaft being rotationally driven.

[3] Instead of the fluid pressure cylinder that drives the second intermediate restriction member 23 to shift, it would also be acceptable to provide a screw shaft that is disposed within the T groove 56, with this screw shaft being passed through and screwed into and engaged with the T groove foot portion 23b, and with the second intermediate restriction member 23 being driven to shift in the horizontal direction by the screw shaft being rotationally driven.

[4] Apart from the above, it would be possible for an ordinary skilled person in the art, without deviating from the gist of the present invention, to implement various additional changes to the embodiments described above, and the present invention is to be understood as also including variant embodiments.

DESCRIPTION OF REFERENCE NUMERALS

1: injection molding machine
11: fixed side clamp plate
12: movable side clamp plate
11a, 12a: mold fixing surfaces
20: mold falling prevention device
21: bottom edge restriction member
21a: bottom edge portion locking member
22, 23: first and second intermediate restriction members
22a: one edge portion locking member
23a: other edge portion locking member 30: vertical direction position determination mechanism
32: bottom edge mold reception member
40: horizontal direction position determination mechanism
41: one mold edge reception member
50: horizontal direction position change mechanism
60, 60A: mold falling prevention devices
61: bottom edge restriction member
62, 63: first and second intermediate restriction members
70: vertical direction position change mechanism
80, 80A: horizontal direction position change mechanisms
90: horizontal direction position change mechanism

The invention claimed is:

1. An injection molding machine comprising a mold falling prevention device that prevents a mold attached to a mold fixing surface from falling off from the mold fixing surface, the injection molding machine further comprising:
   a bottom edge restriction member that is provided to a lower portion of the mold fixing surface so that a position of said bottom edge restriction member in a vertical direction is variable, for implementing restriction so that a bottom edge portion of the mold does not separate from the mold fixing surface; and
first and second intermediate restriction members that are provided to intermediate level portions of the mold fixing surface so that positions of said first and second intermediate restriction members in a horizontal direction are variable, for respectively implementing restrictions so that a one edge portion of the mold and another edge portion thereof in the horizontal direction do not separate from the mold fixing surface; wherein
   a vertical direction position determination mechanism that receives and stops a bottom edge surface of the mold and determines a position of the mold in the vertical direction is provided at a lower portion of the mold fixing surface;
   said vertical direction position determination mechanism comprises a base member fixed to the mold fixing surface, a bottom edge mold reception member disposed above the base member, a pair of guide rods that guide said bottom edge mold reception member so that it is capable of ascending and descending with respect to the base member, a fluid pressure cylinder provided to the base member and capable of raising and lowering said bottom edge mold reception member, and a plurality of support members installed between the base member and said bottom edge mold reception member and capable of supporting the mold; and
   said bottom edge mold reception member and said bottom edge restriction member are formed integrally with one another.

2. The injection molding machine according to claim 1, wherein a fixed side clamp plate to which a plurality of magnetism generating devices are installed is fixed to a plate surface of a fixed platen, with one set of said mold falling prevention device being provided to the mold fixing surface of the fixed side clamp plate; and a movable side clamp plate to which a plurality of magnetism generating devices are installed is fixed to a plate surface of a movable platen, with one set of said mold falling prevention device being provided to a mold fixing surface of the movable side clamp plate.

3. The injection molding machine according to claim 1, wherein a horizontal direction position determination mechanism that receives and stops said one edge portion of the mold from an operating side of the injection molding machine with a one mold edge reception member and that determines a position of the mold in the horizontal direction is provided at an intermediate level portion of said fixed platen or of said fixed side clamp plate; and said one mold edge reception member and said first intermediate restriction member of said horizontal direction position determination mechanism are formed integrally with one another.

4. The injection molding machine according to claim 3, wherein said vertical direction position determination mechanism is adapted to be capable of adjusting a position in the vertical direction of said bottom edge mold reception member, and said horizontal direction position determination mechanism is adapted to be capable of adjusting a position in the horizontal direction of said one mold edge reception member.

5. The injection molding machine according to claim 3, wherein said second intermediate restriction member is disposed in a position corresponding to said other edge portion of the mold, and the second intermediate restriction member is built to shift freely in the horizontal direction; and a fluid pressure cylinder is provided that is capable of shifting the second intermediate restriction member in the horizontal direction.

6. The injection molding machine according to claim 1, wherein said bottom edge restriction member comprises a bottom edge portion locking member that approaches and opposes the bottom edge portion of the mold from an opposite side to the mold fixing surface; and said first intermediate restriction member comprises a one edge portion locking member that approaches and opposes said one edge portion of the mold from an opposite side to the mold fixing surface, and said second intermediate restriction member comprises another edge portion locking member that approaches and opposes said other edge portion of the mold from an opposite side to the mold fixing surface.

7. The injection molding machine according to claim 2, wherein said bottom edge restriction member comprises a bottom edge portion locking member that approaches and opposes the bottom edge portion of the mold from an opposite side to the mold fixing surface; and said first intermediate restriction member comprises a one edge portion locking member that approaches and opposes said one edge portion of the mold from an opposite side to the mold fixing surface, and said second intermediate restriction member comprises another edge portion locking member that approaches and opposes said other edge portion of the mold from an opposite side to the mold fixing surface.

* * * * *